(12) United States Patent
Dilts et al.

(10) Patent No.: US 10,225,992 B2
(45) Date of Patent: Mar. 12, 2019

(54) SINGLE FASTENER ATTACHMENT FOR CHOPPER KNIVES

(71) Applicant: CNH Industrial America LLC, New Holland, PA (US)

(72) Inventors: Mark D. Dilts, New Holland, PA (US); Nathan E. Issac, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 448 days.

(21) Appl. No.: 14/879,162

(22) Filed: Oct. 9, 2015

(65) Prior Publication Data

US 2017/0099778 A1 Apr. 13, 2017

(51) Int. Cl.
| | | |
|---|---|---|
| *A01F 12/40* | (2006.01) | |
| *A01F 29/09* | (2010.01) | |
| *A01D 41/12* | (2006.01) | |
| *A01F 29/02* | (2006.01) | |

(52) U.S. Cl.
CPC ............ *A01F 29/095* (2013.01); *A01D 41/12* (2013.01); *A01F 12/40* (2013.01); *A01F 29/02* (2013.01)

(58) Field of Classification Search
CPC ............................... A01F 29/095; A01F 29/02
USPC ................. 460/112; 56/289, 290, 244, 249.5
See application file for complete search history.

(56) References Cited

U.S. PATENT DOCUMENTS

| | | | | |
|---|---|---|---|---|
| 2,700,189 A | | 1/1955 | Mick | |
| 2,842,175 A | * | 7/1958 | Thompson | A01F 12/40 239/650 |
| 3,717,062 A | * | 2/1973 | Gaeddert | A01F 12/40 241/292.1 |
| 3,815,823 A | * | 6/1974 | Johnson | A01F 12/40 239/650 |
| 4,077,573 A | * | 3/1978 | Kersey | A01F 12/18 241/191 |
| 4,484,587 A | | 11/1984 | Raineri | |
| 6,059,210 A | * | 5/2000 | Smith | B02C 18/145 241/189.1 |
| 6,231,439 B1 | | 5/2001 | Heidjann | |
| 6,450,430 B2 | | 9/2002 | Dykstra et al. | |
| 6,692,351 B2 | * | 2/2004 | Johnson | A01F 12/40 460/112 |
| 7,484,350 B2 | | 2/2009 | Benes et al. | |
| 8,375,826 B1 | * | 2/2013 | Farley | F16F 15/363 460/61 |

(Continued)

FOREIGN PATENT DOCUMENTS

EP 1622490 A1 4/2006

OTHER PUBLICATIONS

European Search Report; 16192986.4-1656; dated Feb. 6, 2017.

*Primary Examiner* — Thomas B Will
*Assistant Examiner* — Mai T Nguyen
(74) *Attorney, Agent, or Firm* — Patrick M. Sheldrake; Peter K. Zacharias (57) ABSTRACT

A chopper knife assembly for use by an agricultural harvester. The chopper knife assembly includes a mounting lug with a fulcrum, wedge, and counterwedge; and at least one bladed knife attached to the mounting lug between the wedge and counterwedge; the assembly is held in place by an attachment means. The bladed knives are able to pivot on the fulcrum of the mounting lug during use, thereby forcing the knife blades onto the counterwedges to provide a more secure retention means.

16 Claims, 9 Drawing Sheets

(56) References Cited

U.S. PATENT DOCUMENTS

| | | | | |
|---|---|---|---|---|
| 8,550,391 | B2* | 10/2013 | Denis | A01G 23/00 241/294 |
| 2002/0107056 | A1 | 8/2002 | Vanee | |
| 2003/0125098 | A1* | 7/2003 | Weichholdt | A01F 12/40 460/112 |
| 2006/0073861 | A1* | 4/2006 | Lauer | A01F 12/40 460/112 |
| 2008/0290198 | A1* | 11/2008 | Benes | A01F 12/40 241/88.4 |
| 2014/0179383 | A1* | 6/2014 | Isaac | A01F 12/40 460/112 |
| 2016/0007537 | A1* | 1/2016 | Dilts | A01F 12/40 460/112 |

* cited by examiner

SINGLE FASTENER ATTACHMENT FOR CHOPPER KNIVES

BACKGROUND OF THE INVENTION

1. Field of the Invention

The present invention relates to agricultural vehicles such as combines, and, more particularly, to chopper knife assemblies used in straw choppers on such vehicles.

2. Description of the Related Art

An agricultural vehicle known as a "combine" is historically termed such because it combines multiple harvesting functions with a single harvesting unit, such as picking, threshing, separating and cleaning A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

The non-desirable crop material, known as "material other than grain" (MOG), can be processed prior to being discharged from the harvester. Typically, this processing involves cutting or "chopping" the MOG into small pieces that are easily handled and distributed. The MOG processing is often accomplished in a "straw chopper", where the MOG is cut up or chopped by multiple knife assemblies mounted on a rapidly-turning rotary shaft. The smaller pieces are then discharged from the harvester and spread onto an agricultural field.

Over time, as the knives encounter the MOG during use, the working edge becomes dull. The knife is then typically removed from its mounting base, "flipped" 180 degrees, and re-secured. Thus, an unused and sharp working edge can be utilized until it, too becomes dull. The entire knife must then be replaced.

In order to achieve a finer and finer size of the MOG, more and more knives are used to process the material. It can be seen that there is therefore a considerable amount of time and labor needed to flip or change the knives.

Additionally, the large amount of torque needed for the bolts typically used to secure the knife to its base does not lend itself to easy installation or removal when service is needed.

The knives also encounter high centrifugal forces from being mounted to a rapidly-turning rotary shaft, as well as large shear and impact forces from contact with the MOG, or unintentional foreign material which may be entrained in the MOG.

What is needed in the art is a way to mount chopper knives in a manner that lends itself to quicker and easier assembly and disassembly, while at the same time providing the adequate strength needed to protect the knives from external forces.

SUMMARY OF THE INVENTION

The present invention provides an agricultural harvester including a chopper knife assembly, with features that enable the chopper knives to be easily removable and adequately strong.

The invention in one form is directed to an agricultural harvester, including a straw chopper with multiple chopper knife assemblies mounted to a rotating shaft. The chopper knife assemblies individually include a mounting lug, at least one bladed knife component, a counterwedge, and a fastener. The mounting lug includes a fulcrum opposite the surface where it is mounted to the rotating shaft, and a wedge. At least one bladed knife component is placed upon the mounting lug with its base in contact with the fulcrum, and one of its beveled edges in contact with the wedge. A counterwedge is placed against the opposite beveled edge of the bladed knife component, and a fastener is used to secure the assembly.

The invention in another form is directed to an agricultural harvester, including a straw chopper with multiple chopper knife assemblies mounted to a rotating shaft. The chopper knife assemblies individually include a mounting lug, at least one bladed knife component, a counterwedge, and a fastener. The mounting lug includes at least one boss, and a wedge. At least one bladed knife component is placed upon the mounting lug with the at least one boss directed through at least one through-hole of the at least one bladed knife component. The at least one knife blade component is then rotated until one of its beveled edges is in contact with the wedge. A counterwedge is placed against the opposite side of the bladed knife component, and a fastener is used to secure the assembly.

The invention in still another form is directed to an agricultural harvester, including a straw chopper with multiple chopper knife assemblies mounted to a rotating shaft. The chopper knife assemblies individually include a mounting lug, at least one bladed knife component, a wedge, a counterwedge, and a fastener. The mounting lug includes at least one boss. At least one bladed knife component is placed upon the mounting lug with the at least one boss directed through at least one through-hole of the at least one bladed knife component. A wedge is placed upon one side of the bladed knife component, and a counterwedge is placed against the opposite side. A fastener is used to secure the assembly.

An advantage of the present invention is to reduce the time needed for the bladed knife components to be flipped or replaced.

Another advantage of the present invention is to allow the operator to disassemble the chopper knife assembly without encountering unnecessarily large torque forces.

Another advantage of the present invention is that the crop load will pivot the bladed knife component about the fulcrum during use, effectively creating a tighter assembly.

Still another advantage of the present invention is the assembly provides structural support to resist centrifugal forces.

Yet another advantage of the present invention is the assembly provides structural support to resist shear and impact forces.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
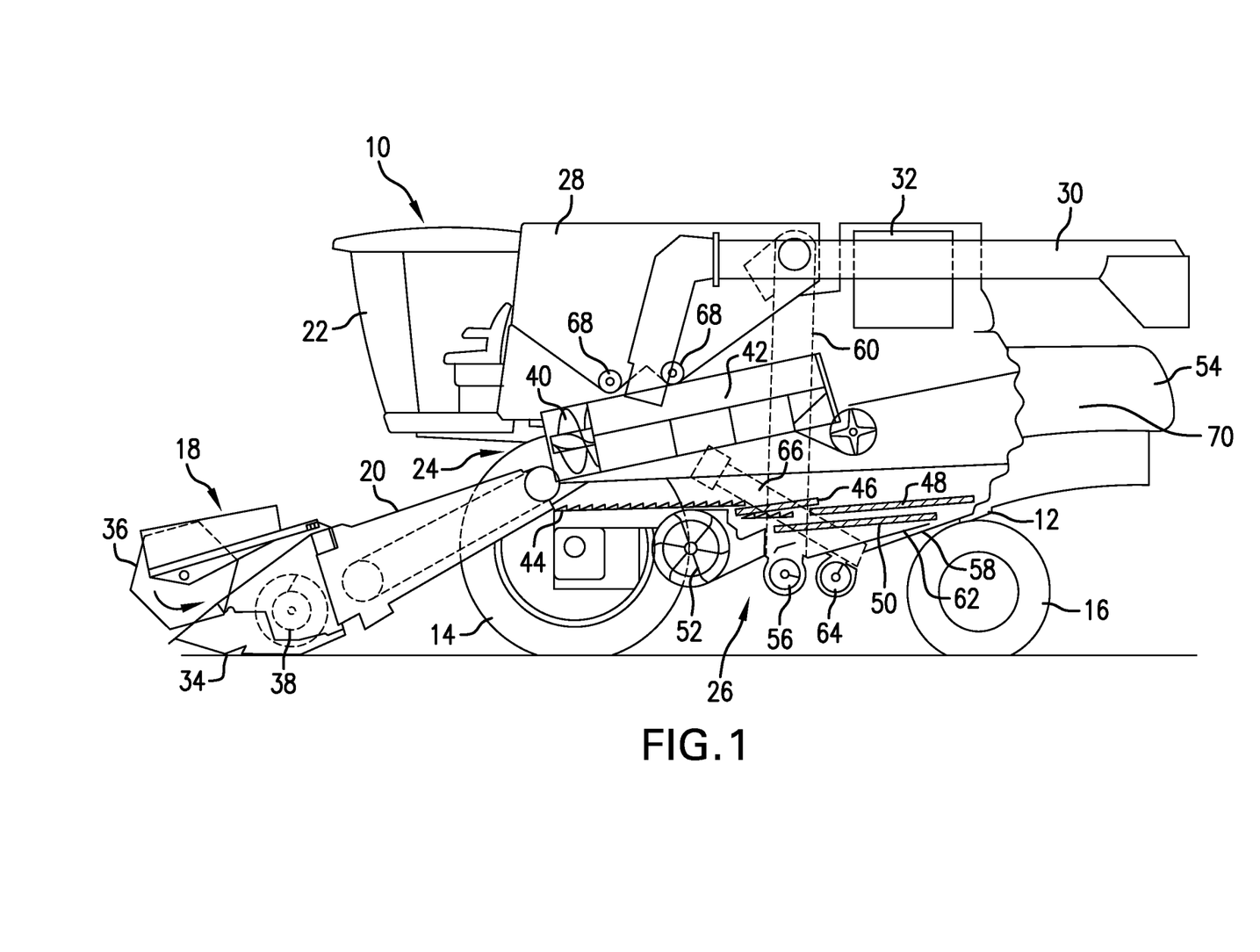
FIG. 1 is a side view of an embodiment of an agricultural vehicle in the form of a combine, which may include an embodiment of a chopper knife assembly as disclosed herein.
Figure 2:
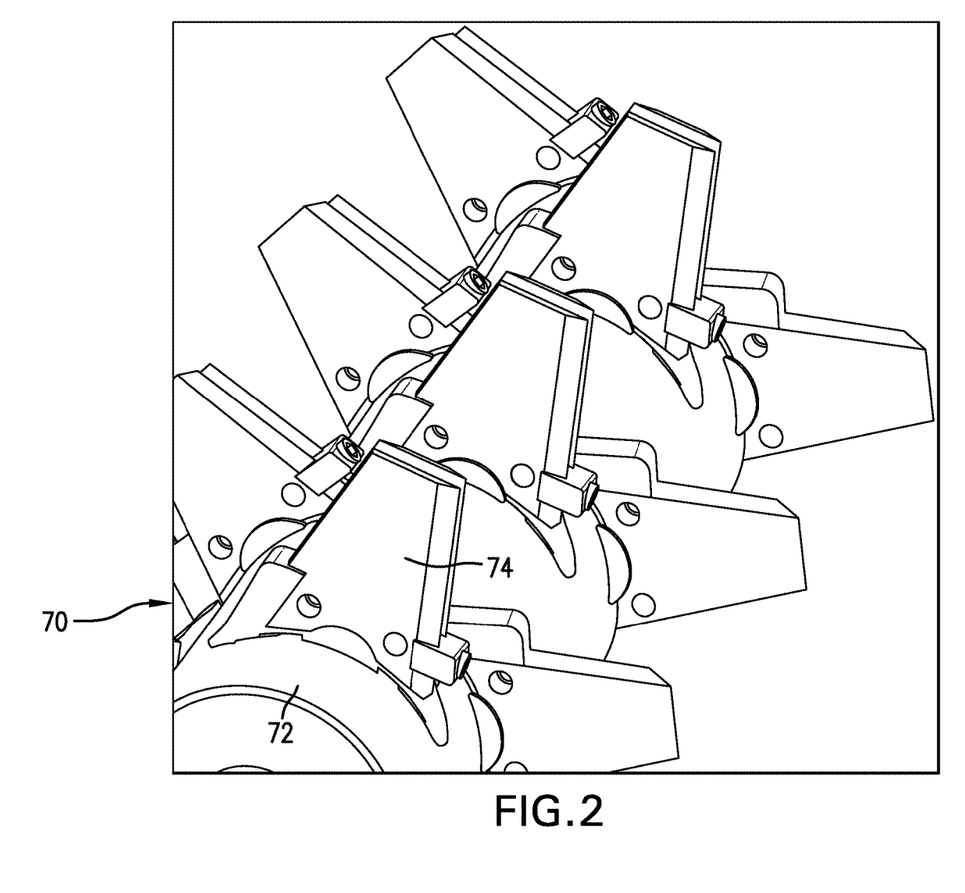
FIG. 2 is a perspective view of a portion of the internal components of the combine shown in FIG. 1, including a straw chopper with multiple chopper knife assemblies.

Referring now to the drawings, and more particularly to FIG. 1, there is shown an agricultural vehicle in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

According to an aspect of the present invention, and referring now to FIGS. 2-5, there is shown a portion of a straw chopper assembly 70 which cooperates with other components inside the harvester to process the MOG into small pieces to be eventually discharged from the rear of combine 10.

In a typical operation, rotating shaft 72 rotates rapidly in a horizontal configuration in the flowpath of the MOG. Attached to rotating shaft 72, in multiple locations along its periphery, are chopper knife assemblies 74. The rotating chopper knife assemblies 74 cooperate with fixed blades or other mechanisms (not shown) to reduce the MOG to small pieces which are then discharged from the rear of combine 10.

Each chopper knife assembly 74 preferentially includes bladed knife components 76 and 77, which are connectively attached to mounting lug 78 and secured with counterwedge 80 and fastener 82.

Figure 3:
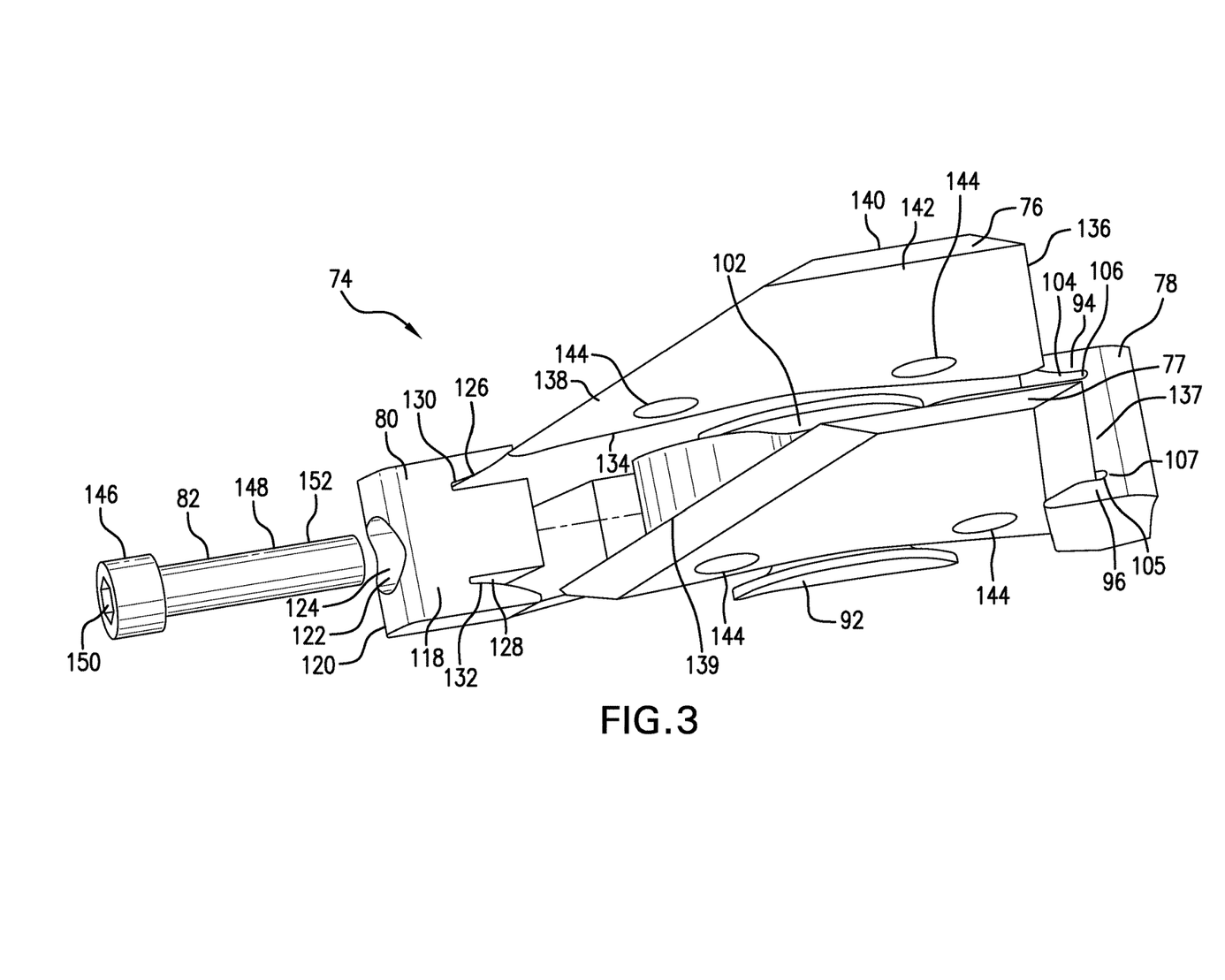
FIG. 3 is an exploded view of a chopper knife assembly shown in FIG. 2.
Figure 4:
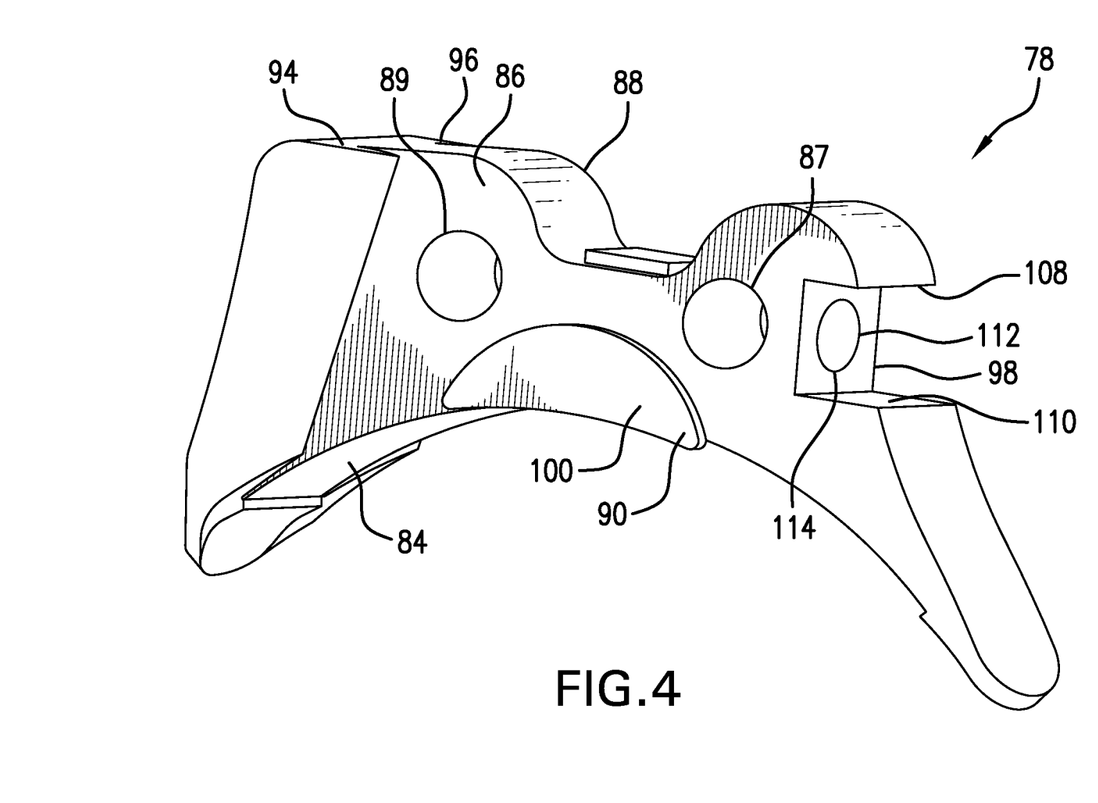
FIG. 4 is a perspective view of the mounting lug of the chopper knife assembly shown in FIG. 3.

Mounting lug 78 includes but is not limited to a base 84, sides 86 and 88, thru-holes 87 and 89, fulcrums 90 and 92, integral wedges 94 and 96, and counterwedge/fastener reception feature 98.

Base 84 on mounting lug 78 is generally concave in shape, permitting temporary or permanent attachment to the convex outer surface of rotating shaft 72. A typical method of securing mounting lug 78 to rotating shaft 72 is by welding, but other means of attachment may be used.

Sides 86 and 88 are arranged in parallel to each other and perpendicular to base 84. For descriptive purposes, side 86 will be described in detail; associated features of side 88 are mirror images of their respective counterparts. Integral to and extending outward from side 86 of mounting lug 78 is fulcrum 90. Fulcrum 90 includes protrusion 100 and contact surface 102, used to retain a portion of bladed knife component 76. Contact surface 102 has a generally convex shape.

Integral to and extending outward from side 86 at the rear of mounting lug 78 is integral wedge 94, which includes one wedge opening 104 with radiused notch 106 for receiving a beveled edge of bladed knife component 76, described in detail elsewhere in this specification.

Now looking at the front of mounting lug 78 (the side opposite the integral wedges), features are included for receiving and securing the counterwedge 80 and fastener 82. Particularly, counterwedge/fastener reception feature 98 includes top surface 108, bottom surface 110, counterbore 112, and threads 114. Counterwedge/fastener reception feature 98 is communicably mated with counterwedge 80 and fastener 82 after assembly and is described in detail elsewhere in this specification.

The material of mounting lug 78 is typically cast or forged metal. However, any suitable metal may be used; and mounting lug 78 may be machined or produced by any other suitable manufacturing method.

Counterwedge 80 includes top surface 118, bottom surface 120, thru-hole 122, countersink 124, counterwedge openings 126 and 128, and radiused notches 130 and 132. Counterwedge 80 is communicably mated with counterwedge/fastener reception feature 98 and fastener 82 after assembly and is described in detail elsewhere in this specification. The material of counterwedge 80 is typically cast, forged, or machined metal; and can be the same as or different from materials used in manufacturing the mounting lug 78.

Bladed knife components 76 and 77 are described herein. For descriptive purposes, bladed knife component 76 will be described in detail; associated features of bladed knife component 77 are mirror images of their respective counterparts. Bladed knife component 76 includes base 134, beveled edges 136 and 138, sides 140 and 142, and at least one thru-hole 144. The material of the bladed knife components 76 and 77 is typically metal but can be any material known to withstand external forces and maintain a sharp edge.

Fastener 82 includes a head 146 and shaft 148. The head 146 of the fastener 82 may include a hexagonal countersink 150 for contact with a corresponding insertion instrument. The shaft 148 of fastener 82 may be partially or fully threaded with threads 152.

The material of fastener 82 is typically metal, but can be any material known to have adequate strength for connecting components. The material of fastener 82 can be the same as or different from materials used in manufacturing the counterwedge 80 or mounting lug 78.

Figure 5:
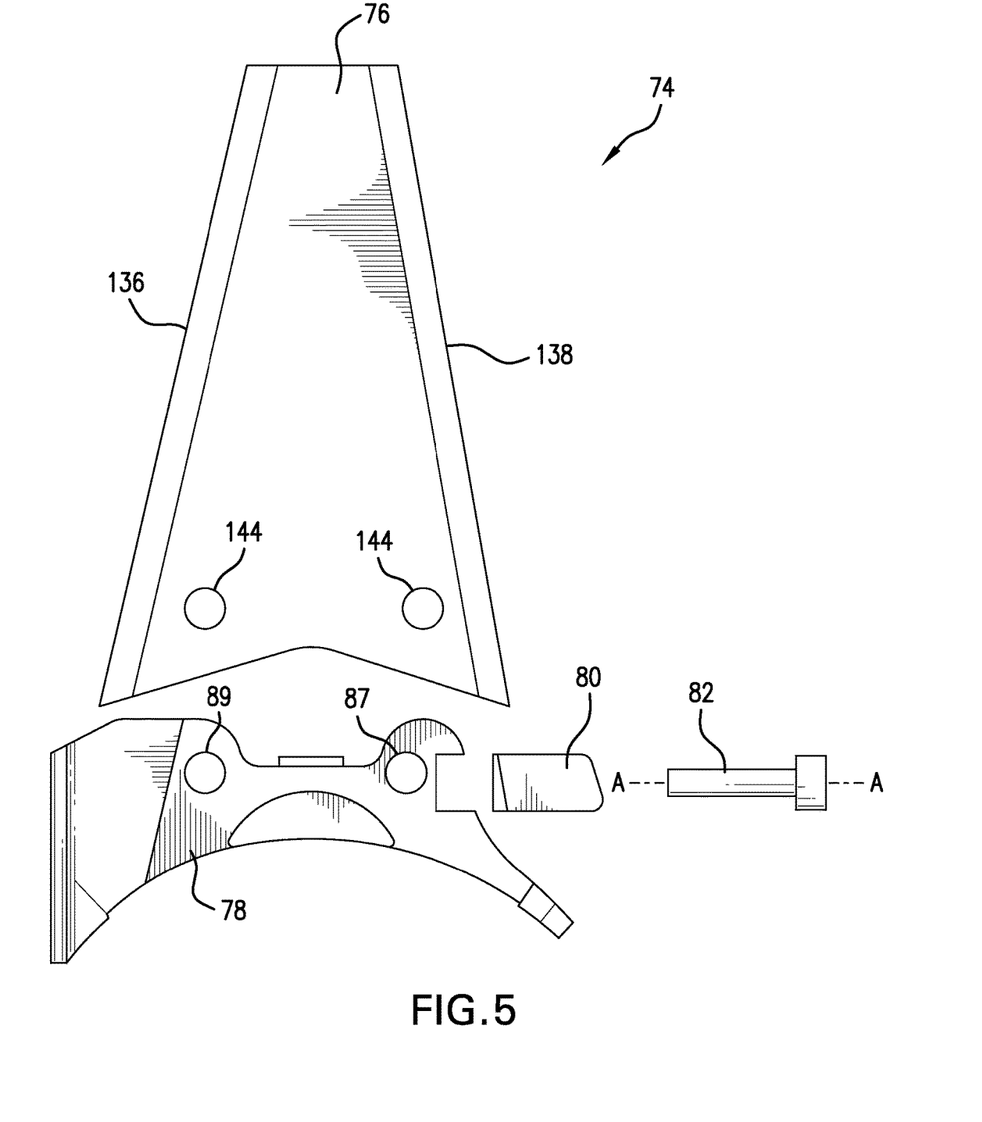
FIG. 5 is a side view of the chopper knife assembly shown in FIG. 3.

The assembly of chopper knife assembly 74 is now discussed in detail. With mounting lug 78 securely attached to rotating shaft 72, bladed knife component 76 is placed with beveled edge 136 into integral wedge 94 in intimate contact with the sides of wedge opening 104 and radiused notch 106, while concurrently base 134 is located on fulcrum 90 between protrusion 100 and side 86, and in contact with contact area 102. After bladed knife component 77 is placed on mounting lug 78 in a similar manner opposite bladed knife component 76, counterwedge 80 is placed into mounting lug 78 so that counterwedge openings 126 and 128 and radiused notches 130 and 132 are in intimate contact with beveled edges 138 and 139, respectively. Finally, fastener 82 is passed through counterwedge 80 and threaded into counterbore 112 of mounting lug 78 and tightened securely.

Radiused notches 106, 107, 130 and 132 are dimensionally larger than beveled edges 136, 137, 138, and 139, respectively. This allows for some "play" during operation of the straw chopper assembly 70; that is, the radiused notches permit some movement of the beveled edges and will therefore not "edge load" the bladed knife components, which could result in loosening. The sides of integral wedge openings 104 and 105 and counterwedge openings 126 and 128, however, are tapered in the same manner as the sides of the bladed knife components, resulting in a secure contact between the mounting lug and the bladed knife components.

The secure contact may actually increase as the centrifugal forces and MOG load act upon the beveled edges 138 and 139 and force beveled edges 136 and 137 into the wedge openings 104 and 105, respectively. This is a result of the convexity of fulcrum bases 90 and 92; bladed knife components 76 and 77 can slidably or rotatably move on their bases 130 and 135, respectively, when in operation.

Counterwedge 80 has features which advantageously secure bladed knife components 76 and 77 to mounting lug 78. In particular, surfaces 118 and 120 of counterwedge 80 are dimensioned appropriately for line-to-line contact with corresponding faces 108 and 110 of counterwedge/fastener reception feature 98 when assembled. In this manner, shear and other forces are adequately resisted. In addition, the dimensions of the thru-hole 122 and countersink 124 of counterwedge 80 are dimensioned appropriately such that fastener 82 will not "bottom out" in the counterbore 112 of mounting lug 78; that is, the assembly can be tightened until it is secure.

A longitudinal axis A-A runs through fastener 82. When chopper knife assembly 74 is completely assembled, longitudinal axis A-A of fastener 82 can be at any angle, but is preferably perpendicular to beveled edges 138 and 139. The desired angle is chosen in order to change reaction forces to optimize the connection or minimize harmful external forces.

Chopper knife assembly 74 allows secure assembly using one fastener, unlike typical assemblies which require two or more high-torque fasteners. However, thru-holes 87 and 88 in mounting lug 78 and thru-holes 144 of bladed knife components 76 and 77 can be utilized with a fastener or fasteners to provide primary or redundant locking With this and other described embodiments, as the working beveled edges become dull, the chopper knife assembly can be disassembled and the bladed knife components can be "flipped" or rotated 180 degrees so sharp beveled edges can then be utilized. After both beveled edges of the bladed knife components become dull, the chopper knife assembly can be disassembled and new bladed knife components installed.

Figure 6:
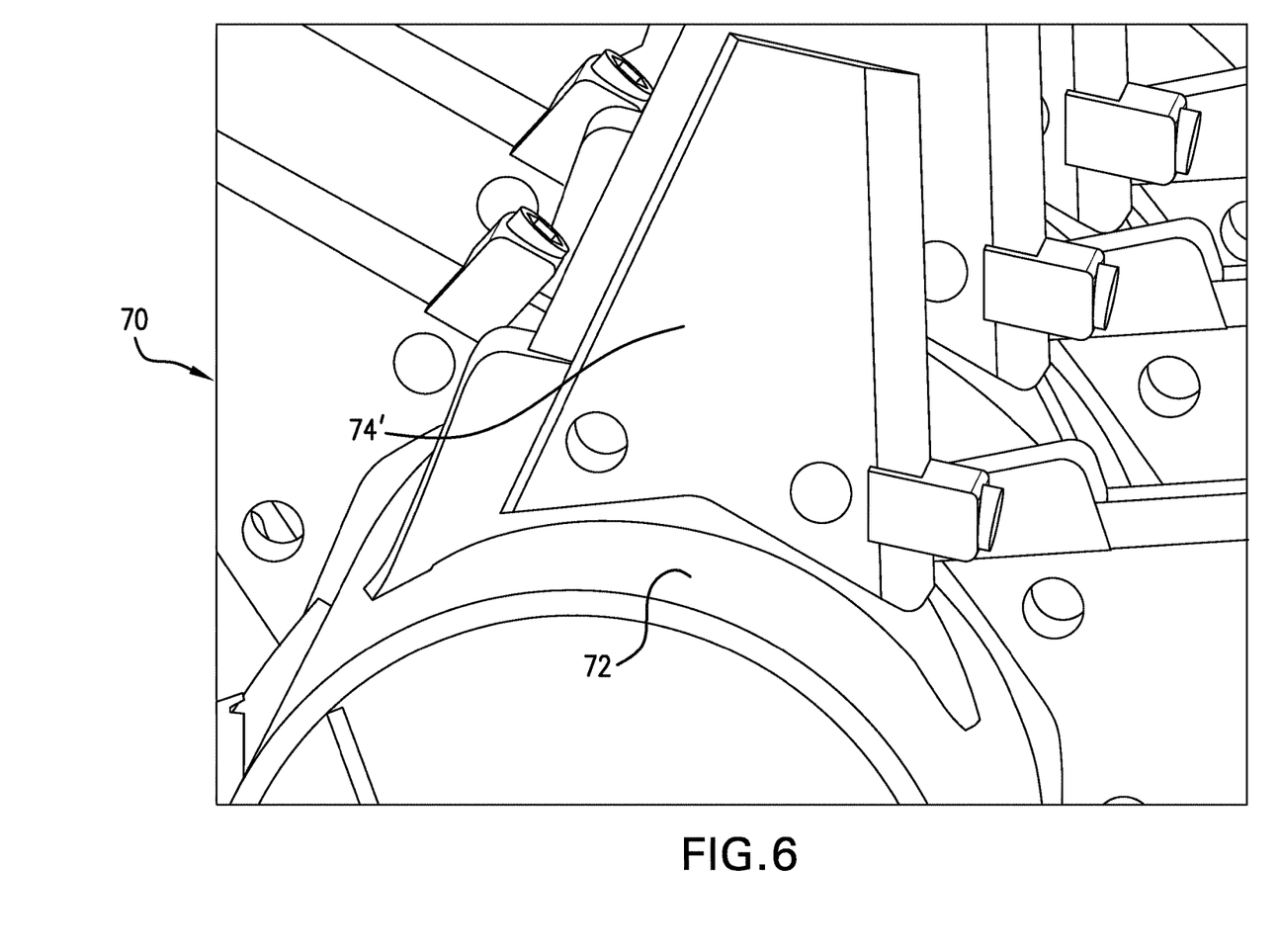
FIG. 6 is a perspective view of a second embodiment of a chopper knife assembly.
Figure 7:
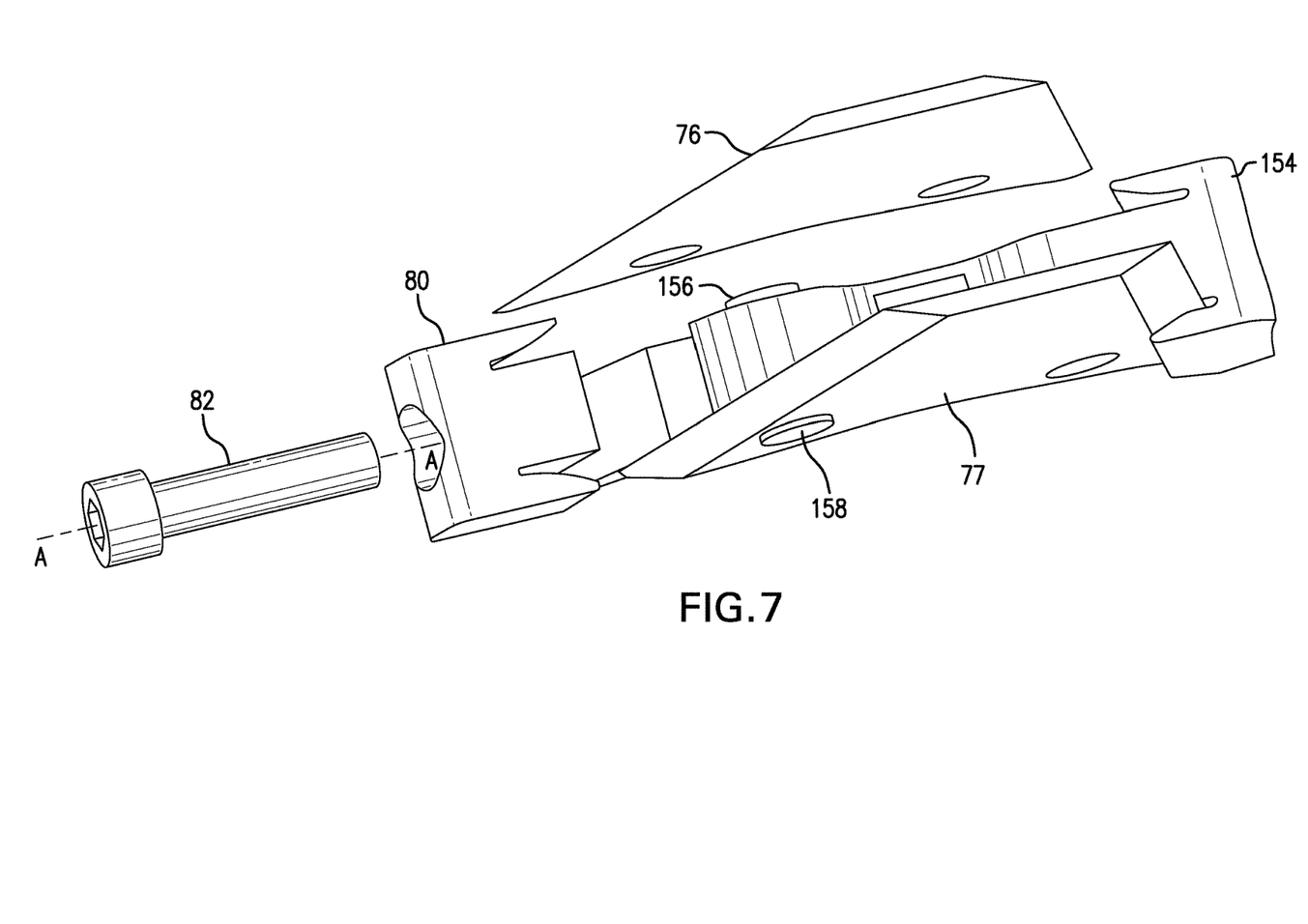
FIG. 7 is an exploded view of the chopper knife assembly shown in FIG. 6.

Referring now to FIGS. 6-7, with continued reference to FIGS. 2-5, an alternative embodiment of chopper knife assembly 74 is described. Chopper knife assembly 74' includes counterwedge 80, fastener 82, and bladed knife components 76 and 77, all identical as previously described.

Mounting lug 154 of chopper knife assembly 74' is similar in every feature to mounting lug 78 previously described, with two exceptions: mounting lug 154 does not include fulcrums 90 and 92; and unlike thru-hole 87 of mounting lug 78, mounting lug 154 includes bosses 156 and 158. Bosses 156 and 158 are each at least longer than the thickness of bladed knife components 76 and 77, respectively, and are of a diameter slightly less than the diameter of thru-holes 144 of bladed knife components 76 and 77.

The assembly of chopper knife assembly 74' is now discussed in detail. With mounting lug 154 securely attached to rotating shaft 72, bladed knife component 76 is placed with beveled edge 136 into integral wedge 94 in intimate contact with the sides of wedge opening 104 and radiused notch 106, while simultaneously thru-hole 144 is located over boss 156. After bladed knife component 77 is placed on mounting lug 154 in a similar manner opposite bladed knife component 76, counterwedge 80 is placed into mounting lug 154 so that counterwedge openings 126 and 128 and radiused notches 130 and 132 are in intimate contact with beveled edges 138 and 139, respectively. Finally, fastener 82 is passed through counterwedge 80 and threaded into mounting lug 154 and tightened securely.

Radiused notches 106, 107, 130 and 132 are dimensionally larger than beveled edges 136, 137, 138, and 139, respectively. This allows for some "play" during operation of the straw chopper assembly 70; that is, the radiused notches permit some movement of the beveled edges and will therefore not "edge load" the bladed knife components, which could result in loosening. The sides of integral wedge openings 104 and 105 and counterwedge openings 126 and 128, however, are tapered in the same manner as the sides of the bladed knife components, resulting in a secure contact between the mounting lug and the bladed knife components.

The secure contact may actually increase as the centrifugal forces and MOG load act upon the beveled edges 138 and 139 and force beveled edges 136 and 137 into the wedge openings 104 and 105, respectively. This is a result of the single bosses 156 on each side of mounting lug 154; bladed knife components 76 and 77 are able to pivot on through holes 144 when in operation.

A longitudinal axis A-A runs through fastener 82. Similar to the assembly of chopper knife assembly 74 (see FIG. 5), when chopper knife assembly 74' is completely assembled, longitudinal axis A-A of fastener 82 can be at any angle, but is preferably perpendicular to beveled edges 138 and 139. The desired angle is chosen in order to change reaction forces to optimize the connection or minimize harmful external forces.

Chopper knife assembly 74' allows secure assembly using one fastener, unlike typical assemblies which require two or more high-torque fasteners.

Figure 8:
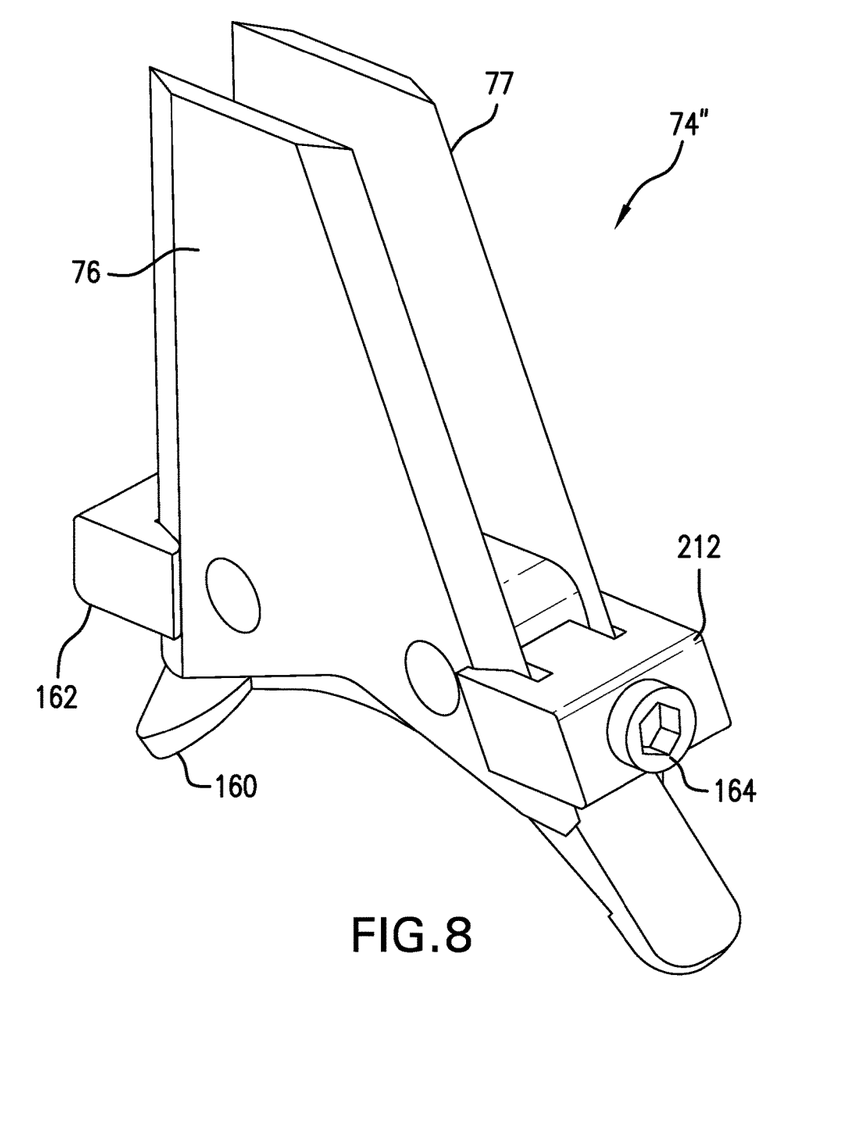
FIG. 8 is a perspective view of a third embodiment of a chopper knife assembly.
Figure 9:
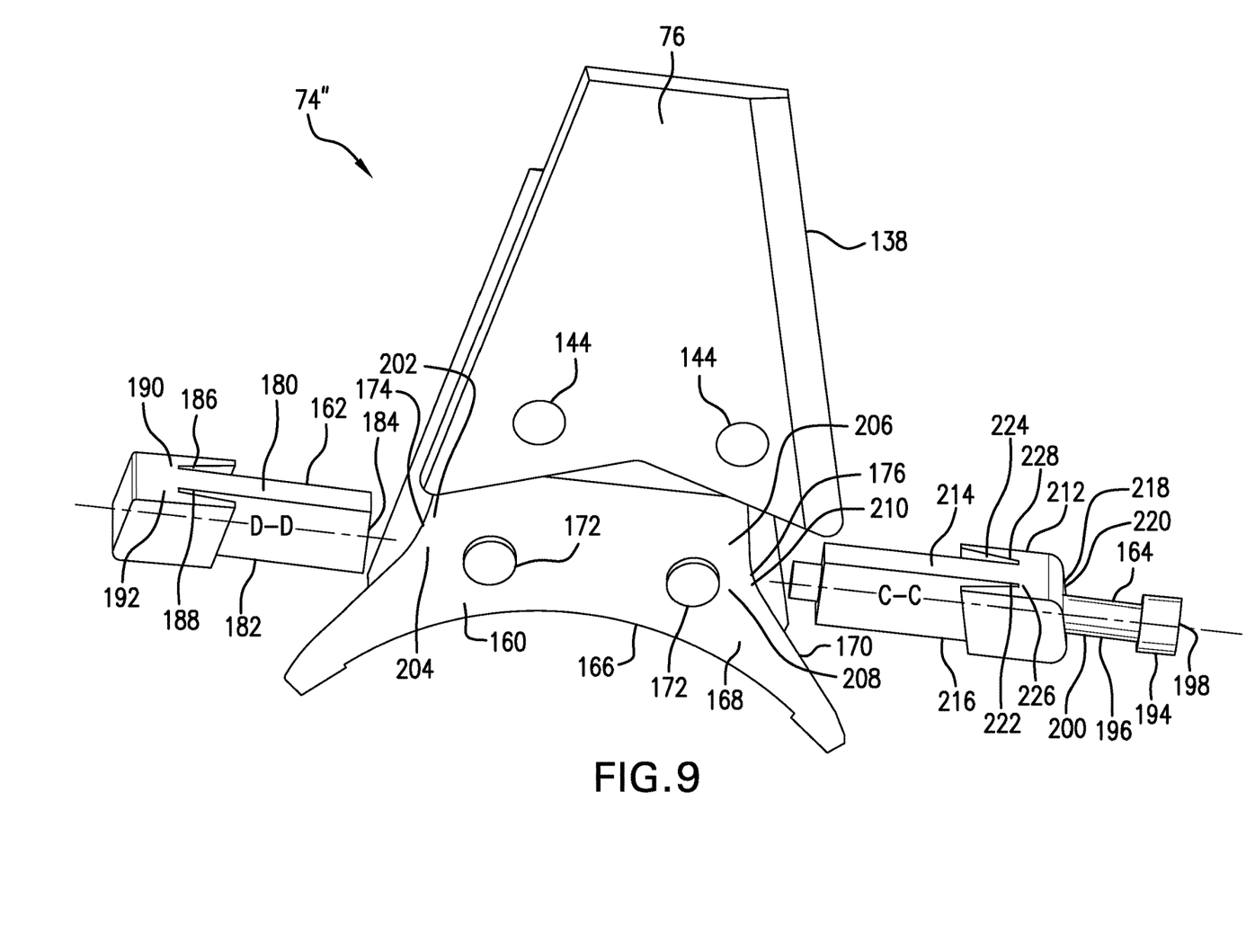
FIG. 9 is an exploded view of the chopper knife assembly shown in FIG. 8.

Referring now to FIGS. 8-9, with continued reference to FIGS. 2-5, another alternative embodiment of chopper knife assembly 74 is described. Chopper knife assembly 74" includes bladed knife components 76 and 77, identical as previously described. Chopper knife assembly 74" also includes mounting lug 160, wedge 162, counterwedge 212, and fastener 164.

Mounting lug 160 includes but is not limited to a base 166, sides 168 and 170, bosses 172, wedge/fastener reception feature 174, and counterwedge/fastener reception feature 176.

Base 166 on mounting lug 160 is generally concave in shape, permitting temporary or permanent attachment to the convex outer surface of rotating shaft 72. A typical method of securing mounting lug 160 to rotating shaft 72 is by welding, but other means of attachment may be used.

Sides 168 and 170 are arranged in parallel to each other and perpendicular to base 166. Integral to and extending outward from side 168 of mounting lug 160 are at least two bosses 172, used to retain a bladed knife component 76 by thru-holes 144. Similarly, integral to and extending outward from side 170 of mounting lug 160 are at least two bosses 172, used to retain a bladed knife component 77 by thru-holes 144. Bosses 172 are each at least longer than the thickness of bladed knife components 76 and 77, respectively, and are of a diameter slightly less than the diameter of thru-holes 144 of bladed knife components 76 and 77.

Wedge 162 includes top surface 180, bottom surface 182, threaded thru-hole 184, wedge openings 186 and 188, and radiused notches 190 and 192. Wedge 162 is communicably mated with wedge/fastener reception feature 174 and fastener 164 after assembly and is described in detail elsewhere in this specification. The material of wedge 162 is typically cast, forged, or machined metal; and can be the same as or different from materials used in manufacturing the mounting lug 160.

Counterwedge 212 includes top surface 214, bottom surface 216, thru-hole 218, countersink 220, counterwedge openings 222 and 224, and radiused notches 226 and 228. Counterwedge 212 is communicably mated with counterwedge/fastener reception feature 176 and fastener 164 after assembly and is described in detail elsewhere in this specification. The material of counterwedge 212 is typically cast, forged, or machined metal; and can be the same as or different from materials used in manufacturing the mounting lug 160.

Fastener 164 includes a head 194 and shaft 196. The head 194 of fastener 164 may include a hexagonal countersink 198 for contact with a corresponding insertion instrument. The shaft 196 of the fastener 164 may be partially or fully threaded with threads 200.

The material of fastener 164 is typically metal, but can be any material known to have adequate strength for connecting components. The material of fastener 164 can be the same as or different from materials used in manufacturing the wedge 162, counterwedge 212 or mounting lug 160.

The assembly of chopper knife assembly 74″ is now discussed in detail. With mounting lug 160 securely attached to rotating shaft 72, bladed knife component 76 is placed with thru-holes 144 located over bosses 172 on side 168, and bladed knife component 77 is placed with thru-holes 144 located over bosses 172 on side 170. Wedge 162 is then placed into mounting lug 160 with sides of wedge opening 186 and radiused notch 190 in intimate contact with beveled edge 136, and sides of wedge opening 188 and radiused notch 192 in intimate contact with beveled edge 137. Counterwedge 212 is then placed into mounting lug 160 with sides of counterwedge opening 222 and radiused notch 226 in intimate contact with beveled edges 138, and sides of counterwedge opening 224 and radiused notch 228 in intimate contact with beveled edge 139. Finally, fastener 164 is passed through counterwedge 212 and threaded into wedge 162 and tightened securely.

Radiused notches 190, 192, 226 and 228 are dimensionally larger than beveled edges 136, 137, 138, and 139, respectively. This allows for some "play" during operation of the straw chopper assembly 70; that is, the radiused notches permit some movement of the beveled edges and will therefore not "edge load" the bladed knife components, which could result in loosening. The sides of wedge openings 186 and 188 and counterwedge openings 222 and 224, however, are tapered in the same manner as the bladed knife components, resulting in a secure contact between the mounting lug and the bladed knife components.

Wedge 162 and counterwedge 212 have features which advantageously secure bladed knife components 76 and 77 to mounting lug 160. In particular, surfaces 180 and 182 of wedge 162 are dimensioned appropriately for line-to-line contact with corresponding faces 202 and 204 (not shown) of wedge/fastener reception feature 174 when assembled. Similarly, surfaces 214 and 216 of counterwedge 212 are dimensioned appropriately for line-to-line contact with corresponding faces 206 and 208 (not shown) of counterwedge/fastener reception feature 176. In this manner, shear and other forces are adequately resisted. In addition, the dimensions of the thru-hole 218 and countersink 220 of counterwedge 212 are dimensioned appropriately such that fastener 164 will not "bottom out" in the threaded thru-hole 182 of mounting lug 160; that is, the assembly can be tightened until it is secure.

A longitudinal axis C-C runs through fastener 164 and a longitudinal axis D-D runs through wedge 162. Similar to the assembly of chopper knife assembly 74 (see FIG. 5), when chopper knife assembly 74″ is completely assembled, longitudinal axes C-C and D-D of fastener 164 and wedge 162, respectively, can be at any angle, but are preferably perpendicular to beveled edges 138 and 139. The desired angle is chosen in order to change reaction forces to optimize the connection or minimize harmful external forces.

Chopper knife assembly 74″ allows secure assembly using one fastener, unlike typical assemblies which require two or more high-torque fasteners.

While a chopper knife assembly has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
   a chassis;
   a threshing and separating system for processing harvested material carried by the chassis; and
   a straw chopper assembly downstream of the harvested material flow from the threshing and separating system, the straw chopper including at least one chopper knife assembly and a rotating shaft, the at least one chopper knife assembly being coupled to the rotating shaft, each chopper knife assembly having:
      a mounting lug coupled to the rotating shaft and including a wedge with at least one opening;
      at least one bladed knife component coupled to the mounting lug and including a tapered edge;
      a counterwedge with at least one opening coupled to the at least one bladed knife component such that a portion of the bladed knife component contacts a respective portion of said at least one opening of the counterwedge; and
      a fastener coupling the counterwedge to the mounting lug, wherein at least one of the at least one opening of the wedge and the at least one opening of the counterwedge is tapered for receiving the tapered edge of the at least one bladed knife component.

2. The agricultural harvester of claim 1, wherein the mounting lug includes at least one fulcrum.

3. The agricultural harvester of claim 2, wherein the at least one bladed knife component includes a base in contact with the at least one fulcrum.

4. The agricultural harvester of claim 1, wherein the at least one opening of the wedge or counterwedge is radiused for receiving a beveled edge of the at least one bladed knife component in a manner which prevents edge loading.

5. The agricultural harvester of claim 1, wherein the fastener is a threaded bolt.

6. The agricultural harvester of claim 1, wherein the straw chopper includes a plurality of chopper knife assemblies, each of the chopper knife assemblies having two bladed knife components.

7. A chopper knife assembly for use on an agricultural harvester, the chopper knife assembly comprising:
   a mounting lug including a wedge with at least one opening;
   at least one bladed knife component coupled to the mounting lug and including a tapered edge;
   a counterwedge with at least one opening coupled to the at least one bladed knife component such that a portion of the bladed knife component contacts a respective portion of said at least one opening of the counterwedge; and a fastener coupling the counterwedge to the mounting lug, wherein at least one of the at least one opening of the wedge and the at least one opening of the counterwedge is tapered for receiving the tapered edge of the at least one bladed knife component.

8. The chopper knife assembly of claim 7, wherein the mounting lug includes at least one fulcrum.

9. The chopper knife assembly of claim 8, wherein the at least one bladed knife component includes a base in contact with the at least one fulcrum.

10. The chopper knife assembly of claim 7, wherein the at least one opening of the wedge or counterwedge is radiused for receiving a beveled edge of the at least one bladed knife component in a manner which prevents edge loading.

11. The chopper knife assembly of claim 7, wherein the fastener is a threaded bolt.

12. The chopper knife assembly of claim 7, wherein the mounting lug includes at least one boss.

13. The chopper knife assembly of claim 12, wherein the at least one bladed knife component is in pivotal contact with the at least one boss.

14. The chopper knife assembly of claim 12, wherein the at least one boss is comprised of a hardened steel pin pressed into the mounting lug.

15. The chopper knife assembly of claim 7, wherein the chopper knife assembly includes two bladed knife components.

16. A method of assembling a chopper knife assembly for use on an agricultural harvester, the method comprising the steps of:

mounting at least one bladed knife component on a mounting lug, the mounting lug including a wedge with at least one opening;

moving the bladed knife component along the mounting lug until it is stopped by the wedge, the bladed knife component including a tapered edge;

placing a counterwedge on the opposite side of the at least one bladed knife component contacting the wedge, said counterwedge includes at least one opening such that a portion of the bladed knife component contacts a respective portion of said at least one opening of the counterwedge; and attaching the counterwedge to the mounting lug with a fastener, wherein at least one of the at least one opening of the wedge and the at least one opening of the counterwedge is tapered for receiving the tapered edge of the at least one bladed knife component.

\* \* \* \* \*

UNITED STATES PATENT AND TRADEMARK OFFICE
CERTIFICATE OF CORRECTION

PATENT NO. : 10,225,992 B2
APPLICATION NO. : 14/879162
DATED : March 12, 2019
INVENTOR(S) : Mark D. Dilts et al.

It is certified that error appears in the above-identified patent and that said Letters Patent is hereby corrected as shown below:

On the Title Page

Item (72) under Inventors, please delete "Nathan E. Issac", and substitute therefore --Nathan E. Isaac--.

Signed and Sealed this
Fourteenth Day of May, 2019

Andrei Iancu
*Director of the United States Patent and Trademark Office*